Sept. 19, 1939.    R. L. LERCH ET AL    2,173,484
HARD FACING METAL
Filed Nov. 3, 1936
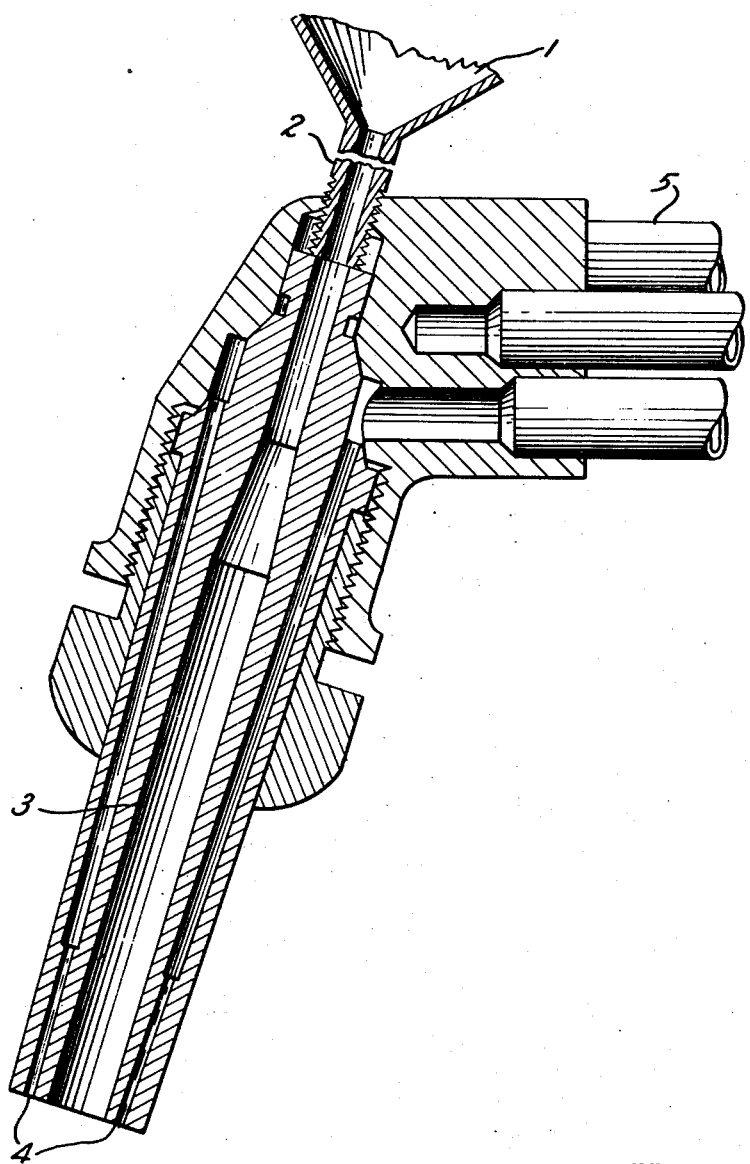
INVENTORS
ROBERT L. LERCH and
WILLIAM A. WISSLER
BY
ATTORNEY Patented Sept. 19, 1939

2,173,484

UNITED STATES PATENT OFFICE 2,173,484

HARD FACING METAL

Robert L. Lerch, Glendale, Calif., and William A. Wissler, Niagara Falls, N. Y., assignors to Haynes Stellite Company, a corporation of Indiana Application November 3, 1936, Serial No. 108,926

2 Claims. (Cl. 148—7)

The invention relates to processes for hardfacing metal articles, and is a process for impregnating the surface of metal articles with thoroughly bonded particles of difficultly fusible diamond substitutes comprising carbides, borides, or silicides, such as tungsten carbide or silicon carbide, for example.

Processes for impregnating the surface of metal articles with wear-resistant infusible particles usually comprise casting such articles against a surface which has been coated with wear-resistant particles in such a manner that the particles are bonded to the metal surface as the casting solidifies; or welding onto the surface of the metal article a layer of wear-resistant particles embedded in a metal matrix derived, usually, from a suitably designed welding rod. The present invention differs from such processes in that the article is treated after it has been cast or otherwise shaped, and that no welding rod need be used to supply matrix metal for bonding purposes.

The invention comprises a process wherein the surface of the metal article to be treated is heated by means of a gas flame welding torch to produce a substantial melting of the surface, for example to a depth of about ⅛ inch, and particles of wear-resistant material are simultaneously projected against the metal surface, within the area against which the welding flame impinges, with sufficient impact force to ensure incorporation of the particles into the surface being treated.

It is a surprising fact that particles of such a substance as tungsten carbide, which are neither melted nor dissolved under the conditions of the process, should adhere to the metal surface when applied in this manner, yet we have found that such particles not only adhere to the surface but are bonded to it so effectually that the particles then constitute an integral part of the metal article.

In the practice of the invention it has been found desirable, though it is not necessarily essential, to employ a torch having circumferentially arranged flame jets with an opening in the center through which the wear-resistant particles can be fed, because otherwise the particles tend to blow away without being incorporated into the surface, and they are sometimes projected against portions of the metal surface which have not been prepared properly by the action of the flame to receive and bond the particles. Apparatus for the practice of the invention may readily be provided by modification of a cutting torch equipped with a centrally disposed opening ordinarily used for the auxiliary oxygen jet. The oxygen supply pipe is disconnected and a short pipe, which may be vertically disposed, is attached to the torch so as to open into the oxygen passage, for the purpose of directing the particles into the central portion of the welding flame. In this manner the necessary impact force of the infusible particles can be obtained, in most cases, by merely dropping the particles through the tube, a fall of as little as 6 inches being sufficient, for example, in the case of tungsten carbide particles. Less dense particles will usually require a greater drop, but even relatively light silicon carbide particles require a drop of only five or six feet in order to ensure proper bonding.

It will be evident that the invention is not restricted to the particular method described for impacting the particles against the metal surface, but that other means may be employed such as any mechanical device adapted to project the particles against the surface within the flame area and to provide the required velocity and control of the rate of feeding the particles. The use of a jet of gas for projecting the particles against the metal surface is, however, expressly avoided, because such a blast tends to chill the melted surface metal and to blow the solid particles away from the area against which the welding flame impinges.

We are aware of previous processes wherein metal is melted and droplets of molten metal are sprayed onto a metallic surface by means of an atomizing and directing jet of gas, and we are further aware of a process proposed for hardening the surface of iron articles by heating the surface to a red heat and projecting particles of carbon or of hardening metals against the red hot surface. The process of the present invention differs from all such prior processes in that the surface of the metal article is fused to an appreciable depth, the projected particles are not fused but are projected and impregnated into the fused metallic surface as solid particles; and the use of a jet of gas for the purpose of projecting the particles is expressly avoided.

The process of the invention has been successfully employed for surfacing steel, "Monel" metal, bronze and aluminum articles with tungsten carbide and silicon carbide. It has been found particularly useful because of its extreme flexibility, in that the wear-resistant particles can be deposited thickly or sparsely or even omitted from portions of the surface being treated, as desired. Furthermore, it has been found that relatively thick wear-resistant surfaces can be built up by applying successive coating of wear-resistant particles in the manner of the invention, and covering each coating in turn with a layer of fusion deposited weld metal derived from a welding rod, which may conveniently be held and manipulated by the welder in usual manner. By means of this procedure any desired relationship or proportion may be had with respect to wear-resistant particles and matrix metal, as opposed to surfacing by means of composite rods having fixed ratios of wear-resistant particles to matrix metal.

Apparatus of the type decribed, adapted for the purpose of carrying out the method of the invention, is illustrated diagrammatically in the attached drawing of a cross section of the head of a cutting torch showing a funnel 1 attached to the torch by means of a pipe 2 through which particles may be dropped into the upper end of an oxygen passage 3; welding gas ducts 4 disposed circumferentially about oxygen passage 3; and a "cutting oxygen" pipe 5 which is normally connected to oxygen passage 3 but which for the practice of the invention may if desired be sealed off to prevent flow of oxygen to the central passage through which the particles are to be dropped.

We claim:

1. Process for applying to a metal article a surface coating of wear-resistance character and of substantial thickness, which process comprises melting to an appreciable depth successive portions of the surface of the article by applying thereto a gas welding flame, and simultaneously projecting and impacting against the melted surface metal, within the impingement area of the welding flame, particles of difficultly fusible diamond substitute material comprising tungsten carbide, silicon carbide or the like, and subsequently covering the hard-faced surface thus formed with a layer of fusion-welded matrix metal deposited from a welding rod, and repeating the cycle of operations as many times as may be necessary to produce a hard surface layer of desired thickness and desired ratio of diamond substitute material to matrix metal.

2. Process as defined in claim 1, wherein the welding flame is annular in shape.

ROBERT L. LERCH.
WILLIAM A. WISSLER.